United States Patent [19]
Seidel

[11] 3,827,220
[45] Aug. 6, 1974

[54] SAFETY GUARDS FOR ROTARY LAWNMOWERS

[75] Inventor: David Paul Seidel, Milperra, New South Wales, Australia

[73] Assignee: Victor Limited, New South Wales, Australia

[22] Filed: Oct. 10, 1972

[21] Appl. No.: 296,169

[30] Foreign Application Priority Data

Oct. 11, 1971 Australia.................6604/71

[52] U.S. Cl. ............................................ 56/320.2
[51] Int. Cl............................................. A01d 67/00
[58] Field of Search.............. 56/17.4, 320.2, 202

[56] References Cited
UNITED STATES PATENTS

| | | | |
|---|---|---|---|
| 3,404,519 | 10/1968 | Demers | 56/320.2 X |
| 3,423,918 | 1/1969 | Siwek | 56/17.4 X |
| 3,636,686 | 1/1972 | Meyer et al. | 56/320.2 |
| 3,706,190 | 12/1972 | Taub | 56/320.2 X |

Primary Examiner—Russell R. Kinsey
Attorney, Agent, or Firm—Eric H. Waters

[57] ABSTRACT

A safety cover guard for the grass discharging orifice of a rotary lawnmower provided with a removable grasscatcher having a protruding lip for gathering cuttings close to the blade cutting circle, the cover guard having a lower pivoted flap to enable the protruding lip to enter the orifice while the cover guard is in position, means operable while the grasscatcher is attached for removing the cover guard from the orifice, and resilient means for restoring the flap when the protruding lip of the grasscatcher is withdrawn.

6 Claims, 3 Drawing Figures

SAFETY GUARDS FOR ROTARY LAWNMOWERS

This invention relates to cover guards for the discharge chute orifices of rotary lawnmowers.

Lawnmower discharge chutes have been arranged to provide for discharge of cut grass either to a side or the rear, or even to the front of a rotary lawnmower. For maximum efficiency the terminal orifice of the chute is large with at least the outer extremity of the chute inclining upwardly to achieve grass discharge at as great an elevation as possible. Exposure of this discharging orifice during operation of a lawnmower can be extremely hazardous to bystanders and as a safety precaution cover guards are invariably provided.

On lawnmowers including such guards and designed to incorporate a grasscatcher, exposure of the discharging orifice occurs with attachment and/or detachment of the grasscatcher, or else complicated provision is made for hingeing of the cover guard to the lawnmower baseplate with access thereto, and accommodation thereof in an open condition, being provided in the grasscatcher.

In the case of all these proposals, however, difficulty arises in the design of an efficient cover guard where a grasscatcher of optimum efficiency is incorporated, i.e. a grasscatcher having an extension to protrude through the discharging orifice and into close proximity with the cutting blade orbit. Grasscatchers of this kind are noted for the efficiency with which they collect almost all of the grass cuttings severed from the lawn by the cutting blades.

It is the main object of this invention to provide a cover guard for the discharging orifice of a rotary lawnmower which will permit attachment to a lawnmower of a grasscatcher of the above kind while the cover guard is in position to cover the orifice.

According to the invention there is provided a cover guard for the discharge chute orifice of a rotary lawnmower incorporating a grasscatcher, comprising a displaceable covering member for the orifice movable between open and closed positions, a lower extension of the covering member formed as a flap pivoted for displacement upon engagement with a protruding part of the grasscatcher to allow entry of said protruding part past the covering member into the orifice, and resilient means between the flap and the covering member to restore the flap when said protruding part of the grasscatcher has been withdrawn.

Two preferred embodiments of the cover guard of the present invention are shown in the accompanying drawings, in which.

Figure 1:
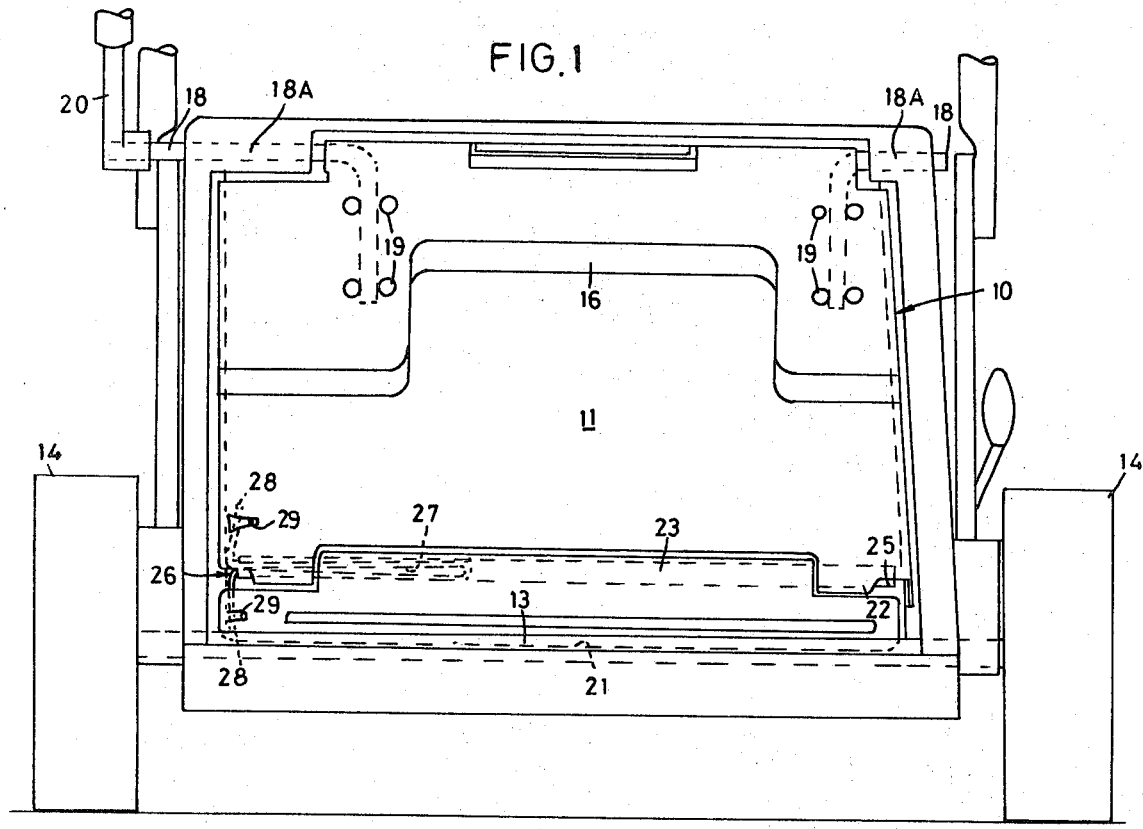
FIG. 1 is a rear elevation of a typical rotary lawnmower showing a first preferred embodiment of the inventive cover guard in closed position.
Figure 2:
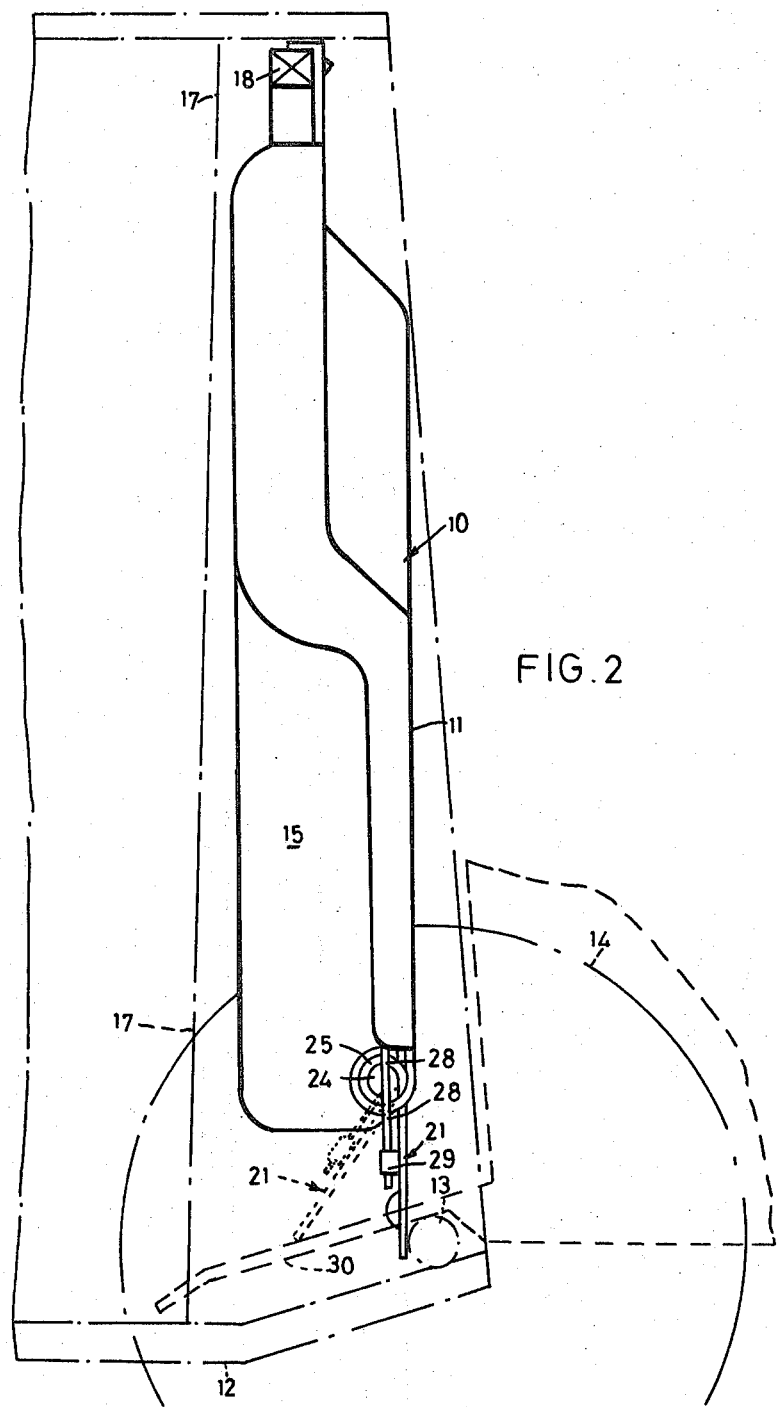
FIG. 2 is a side elevation of the cover guard of FIG. 1, showing the lawnmower in dotted outline only; and, FIG. 3 is a rear elevation of a typical rotary lawnmower showing a second exemplary embodiment of the inventive cover guard adapted to slide vertically when opening or closing.

With reference to FIGS. 1 and 2 of the drawings a first inventive cover guard embodiment 10 consists of a metal plate 11 of a dimension sufficient to enable it to be loosely accommodated within the confines of and to obturate a discharging orifice 12 (FIG. 2 only) at the rear of a lawnmower (not shown in FIG. 2) and in advance of a rear axle 13 for lawnmower wheels 14. The plate 11 preferably is provided with upright side flanges 15 for strengthening purposes and impressions such as 16 may be formed in the body of the plate 11 for stiffening. The plate 11 is preferably rectangular to conform approximately with a corresponding rectangular opening in the discharging orifice 12. From the orifice 12 the discharge chute is inwardly stepped to provide an annular abutment wall 17 for engagement by the flanges 15 of the plate 11 to limit the degree of insertion of the plate 11 in the orifice 12.

In accordance with this embodiment the plate 11 is pivotally mounted to a lawnmower baseplate (not shown) and for this purpose is provided with L-shape pivot rods 18 one arm of each of which is strapped as at 19 to the upper end of the rear face of the plate 11. Journal bearings 18A are provided on the lawnmower baseplate above the discharge orifice 12 to support rotatably the pivot rods 18. The pivot rods 18 preferably are multi-sided so that, in a known fashion, the plate 11 is capable of rotation between two or more supported positions, where it may be retained in an open, or partially open, condition. An operating handle 10 of any suitable form may be secured on one of the pivot rods 19 constituting means to effect manual rotation of the plate 11 between respective raised and lowered, open and closed conditions. As so far described the cover guard 10 is not substantially dissimilar from known guards.

By the invention a flap 21 is pivotally connected to the lower end of the plate 11 and this may be hinged by forming on the lower marginal edge 22 of the plate 11 and the upper marginal edge 23 of the flap 21 one or more tubular folds interleaving so as to form a continuous tubular passage 24 transversely extending across the cover guard 10. A hinge pintle tube 25 preferably of thermoplastic material, is located within the passage 24 to hinge the flap 21 to the lower end of the plate 11. A torsion rod 16 is folded about its midpoint to form a folded stem 27 with coplanar oppositely extending arms 28. The stem 27 of the torsion rod 26 is inserted in one end of the tubular pintle 25 with its arms 28 anchored beneath tabs 29 on the plate 11 and flap 21. The guard 21, therefore, is urged at all times into a position coplanar with the plate 11.

From an understanding of the invention it will be appreciated that the flap 21 may be arranged to assume a different position of repose with respect to the plate 11 from that described and this may be provided for by the relative disposition of the two arms 28 of the torsion rod 26. It has been found that the above described pivotted arrangement of the flap 21 is especially resistant against clogging by resins, dirt and other foreign materials and avoids stress concentrations likely to cause component failure.

In operation a grasscatcher (not shown) may be placed in position upon the lawnmower while the cover guard 10 continues to close the discharging orifice. Due to a protruding lip 30 on the grasscatcher engaging with and pivoting the flap 21 inwardly to the position shown chain dotted in FIG. 2 the lawnmower may be operated with the cover guard 10 concealing the orifice 12 if grass catching is not desired or it may be pivoted by the handle 20 to open the orifice 12 to the interior of the grasscatcher. Any suitable means may be employed to hold the cover guard 10 open. The cover guard 10 may subsequently be returned to cover the orifice 12 before the grasscatcher is removed from the lawnmower.

When the grasscatcher has been removed after the cover guard 10 has been restored to the orifice 12 it will be necessary to advance the plate 11 into the orifice 12 so that the flap 21 passes over and behind the axle 13 or other protuberance on the lawnmower baseplate. The air blast through the orifice 12 does not cause the cover guard 10 to pivot open at this time and thereby render the lawnmower unsafe. The flexibility of the torsion rod 26 will be such as to resist the air blast and maintain the plate 11 and flap 21 substantially coplanar. The location of the abutment 17 within the orifice 12 will be so located as to ensure that the cover guard 10 cannot be introduced to an extent where it will foul the operating cutting blades.

Figure 3:
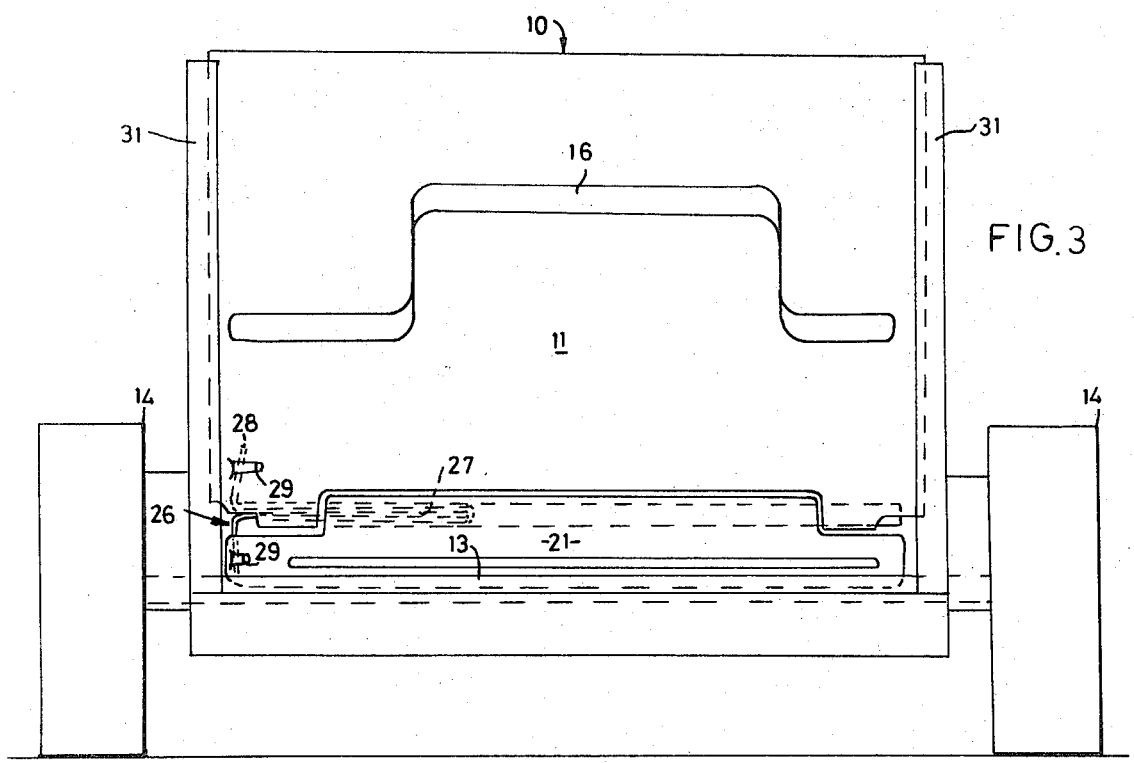

With reference to FIG. 3 where like references are used for similar parts to those described above, a second embodiment of the cover guard 10 is depicted with a plate 11 and pivoted flap 21 slidably connected with the lawnmower baseplate so that it may be lifted when desired to uncover the orifice 12. As can be seen the upper pivot rods 18 of the previous embodiment are omitted and suitable channel guides 31 provided in the lawnmower baseplate to either side of the orifice 12. In all other respects, including engagement of the flap 21 with the axle 13 to prevent the flap 21 being blown open, this form of cover guard 10 functions similarly to that described in the foregoing passages.

Where terms such as "lower", "upper", "front", "rear" and the like are used it is to be understood that the lawnmower is assumed to be standing upright upon its wheels and in a normal operating position for propelling by an operator positioned at its rear.

What I claim is:

1. A rotary lawnmower comprising a baseplate provided with an underside discharge chute terminating in an orifice, a grasscatcher for detachable mounting upon said baseplate adjacent said orifice and having a protruding portion for entry into said orifice, and a cover guard for said orifice displaceably mounted on said baseplate for movement between open and closed conditions, a pivoted flap on a lower end portion of said cover guard engageable by said protruding portion for displacement to permit said protruding portion to pass into said orifice while said cover guard is closed, and resilient means attached to said flap to restore the latter when said protruding portion is withdrawn with removal of said grasscatcher from the lawnmower.

2. The lawnmower as defined in claim 1, wherein said cover guard includes manually operable means for opening and closing the same, said manually operable means being accessible and operable when said grasscatcher is attached to the lawnmower.

3. The lawnmower as defined in claim 2, further comprising an axle carrying a pair of supporting wheels for the lawnmower, said axle extending adjacent the bottom of said orifice, and wherein said cover guard is a plate pivoted to said baseplate at a position near the top of said orifice so that in closing said flap engages and passes over said axle, and in the closed condition of said cover guard said axle provides an abutment for said flap to prevent said cover guard being blown open by air and grass cuttings arriving at said orifice via said discharge chute.

4. The lawnmower as defined in claim 1, wherein said covering member is a substantially flat plate slidable up and down within guides fixed on the lawnmower for manual opening and closing of said cover guard.

5. The lawnmower as defined in claim 1, wherein said flap is hinged to said cover guard, including a tubular hinge pintle, and said resilient means is a torsion rod folded into a stem with its ends outwardly flared from one end of said stem, the latter being accommodated within one end portion of said hinge pintle, and the flared ends of said torsion rod being secured respectively to said flap and said cover guard to urge both into a predetermined relative angular position.

6. The lawnmower as defined in claim 5, wherein said hinge pintle is of a synthetic thermoplastic material.

* * * * *

UNITED STATES PATENT OFFICE
CERTIFICATE OF CORRECTION

Patent No. 3,827,220  Dated August 6, 1974

Inventor(s) David Paul Seidel

It is certified that error appears in the above-identified patent and that said Letters Patent are hereby corrected as shown below:

The name of the assignee should read -- Victa Limited --.

Signed and sealed this 15th day of April 1975.

(SEAL)
Attest:

RUTH C. MASON
Attesting Officer

C. MARSHALL DANN
Commissioner of Patents
and Trademarks